United States Patent
Gertsvolf et al.

(10) Patent No.: US 6,597,495 B2
(45) Date of Patent: Jul. 22, 2003

(54) FOUR WAVE MIXING REDUCTION IN RAMAN AMPLIFIERS

(75) Inventors: Marina Gertsvolf, Ottawa (CA); Andrew Robinson, Ottawa (CA); Baozhu Steven Luo, Kanata (CA); Robert Larose, Nepean (CA); James Ghadbane, Kanata (CA)

(73) Assignee: Ceyba Corp., Ottawa (CA)

(*) Notice: Subject to any disclaimer, the term of this patent is extended or adjusted under 35 U.S.C. 154(b) by 0 days.

(21) Appl. No.: 09/982,329

(22) Filed: Oct. 18, 2001

(65) Prior Publication Data

US 2003/0039438 A1 Feb. 27, 2003

Related U.S. Application Data

(60) Provisional application No. 60/315,192, filed on Aug. 27, 2001.

(51) Int. Cl.⁷ .............................................. H04B 10/12
(52) U.S. Cl. ................ 359/341.3; 359/333; 359/334; 359/341.1; 385/24; 385/27
(58) Field of Search ............... 359/334, 341.1, 359/341.3, 333; 372/6, 70; 385/24, 123, 27

(56) References Cited

U.S. PATENT DOCUMENTS

| | | | |
|---|---|---|---|
| H742 H | 2/1990 | Bobbs et al. ................ | 330/4.3 |
| 5,546,210 A | 8/1996 | Chraplyvy et al. .......... | 359/124 |
| 5,559,910 A | 9/1996 | Taga et al. .................... | 385/24 |
| 5,677,786 A | 10/1997 | Meli ........................... | 359/341 |
| 6,014,479 A | 1/2000 | Darcie ......................... | 385/24 |
| 6,101,024 A | 8/2000 | Islam et al. | |
| 6,204,960 B1 | 3/2001 | Desurvire | |
| 6,384,963 B2 * | 5/2002 | Ackerman et al. .......... | 359/334 |
| 6,456,426 B1 * | 9/2002 | Bolshtyansky et al. ..... | 359/334 |
| 2001/0036347 A1 | 11/2001 | Hansen et al. .............. | 385/123 |

FOREIGN PATENT DOCUMENTS

EP 1130704 A2 2/2001

OTHER PUBLICATIONS

Inoue, Kyo, Arrangement of Orthogonal Polarized Signals for Suppressign Fiber Four–Wave Mixing in Optical Multichannel Transmission Systems, IEEE Photonics Technology Letters, vol. 3, No. 6, Jun. 1991.

Fludger, C.R.S., Handerek, V., Mears, R.J., Pump to Signal RIN Transfer in Raman Fiber Amplifiers, Journal of Lightwave Technology, vol. 19, No. 8, Aug. 2001.

* cited by examiner

Primary Examiner—Audrey Chang
Assistant Examiner—Denise S. Allen
(74) Attorney, Agent, or Firm—Harness, Dickey & Pierce, P.L.C.

(57) ABSTRACT

An improved method is provided for reducing four-wave mixing induced degradation in an optical data signal traversing an optical transport network that uses Raman amplifiers. The method includes: introducing at least two Raman amplifiers into the optical transport network, each Raman amplifier having a laser source, and synchronously modulating the laser sources of the Raman amplifiers, thereby reducing four-wave mixing in the optical data signal. Modulation of the laser sources is performed at such a rate that crosstalk from the modulation to the optical data signals experiencing the Raman gain is minimized.

19 Claims, 3 Drawing Sheets

FOUR WAVE MIXING REDUCTION IN RAMAN AMPLIFIERS

This application claims priority under 35 U.S.C. §119(e) to U.S. Provisional Application No. 60/315,192 filed on Aug. 27, 2001 and entitled "FWM REDUCTION IN RAMAN AMPLIFIERS" the specification and drawings of which are hereby expressly incorporated by reference.

FIELD OF THE INVENTION

The present invention relates generally to a method for reducing four-wave mixing induced degradation in an optical data signal traversing an optical transport network and, more particularly, to a method for reducing four-wave mixing caused by Raman amplifiers operating in long haul, wavelength division multiplexing optical transport networks.

BACKGROUND OF THE INVENTION

Optical fibers are used to carry optical signals in an optical transport network. However, optical signals may suffer from attenuation (i.e., loss of power) as they travel over long distances. For long fiber spans, the optical signal may be so attenuated that it no longer can be accurately or reliably detected. If the optical signal is to travel further, it must be amplified. Optical amplifiers are employed at different points along the signal path in order to reconstitute the attenuated optical signal, thereby expanding the effective reach of an optical transport network.

Of particular interest, Raman amplifiers may be used to amplify optical signals traversing through long haul optical transport networks. Here, pump sources are used to introduce intense pump light into the transmission fiber to achieve gain via the non-linear Raman effect. In order to achieve wide gain bandwidth, multiple pump laser sources operating at different wavelengths are typically used at a given amplification site.

Four-wave mixing has been a persistent problem in the drive to develop dense wavelength division multiplexing (DWDM) optical transport networks. When multiple wavelengths pass through the same optical fiber, they may interact with each other to generate an additional lightwave. This is known as four-wave mixing. In the context of DWDM optical systems, the additional lightwave will likely interfere with an existing signal channel, thereby causing signal degradation within the system. The efficiency of the FWM product generation depends on many factors, including the fiber dispersion at wavelengths of the interacting light signals, and the polarization orientation of the interacting wavelengths.

Raman amplifiers operating in such DWDM optical transport networks may contribute to the four-wave mixing problem. For instance, the pump lasers associated with a Raman amplifier designed to give gain in the L-band wavelength region (e.g., 1570–1610 nm) may produce four-wave mixing products in the C-band wavelength region (e.g., 1520–1565 nm). The four-wave mixing products in turn cause degradation of the optical data signals residing in the C-band wavelength region. Likewise, Raman amplifiers operating in both L-band and C-band wavelength regions may produce four-wave mixing products in both L-band and C-band wavelength data regions. In the past, this problem did not exist because C and L bands were not combined together in one optical fiber or, if combined, Raman amplifiers have not been used.

Therefore, it is desirable to provide a method for reducing four-wave mixing caused by Raman amplifiers operating in long haul, wavelength division multiplexing optical transport networks.

SUMMARY OF THE INVENTION

In accordance with the present invention, an improved method is provided for reducing four-wave mixing induced degradation in an optical data signal traversing an optical transport network that uses Raman amplifiers. The method includes: the presence of at least two Raman pump laser sources operating at different wavelengths that create four wave mixing products in an optical fiber span, and synchronously modulating the laser sources in such a way that at any time, in any section of the fiber span, all of the pump wavelengths required to produce the FWM products are not present at once, thereby preventing the four-wave mixing process. At the same time, pump modulation is performed at such a high rate that crosstalk from the modulation to the optical data signals experiencing the Raman gain is minimized.

For a more complete understanding of the invention, its objects and advantages, reference may be had to the following specification and to the accompanying drawings.

DETAILED DESCRIPTION OF THE PREFERRED EMBODIMENTS

Figure 1:
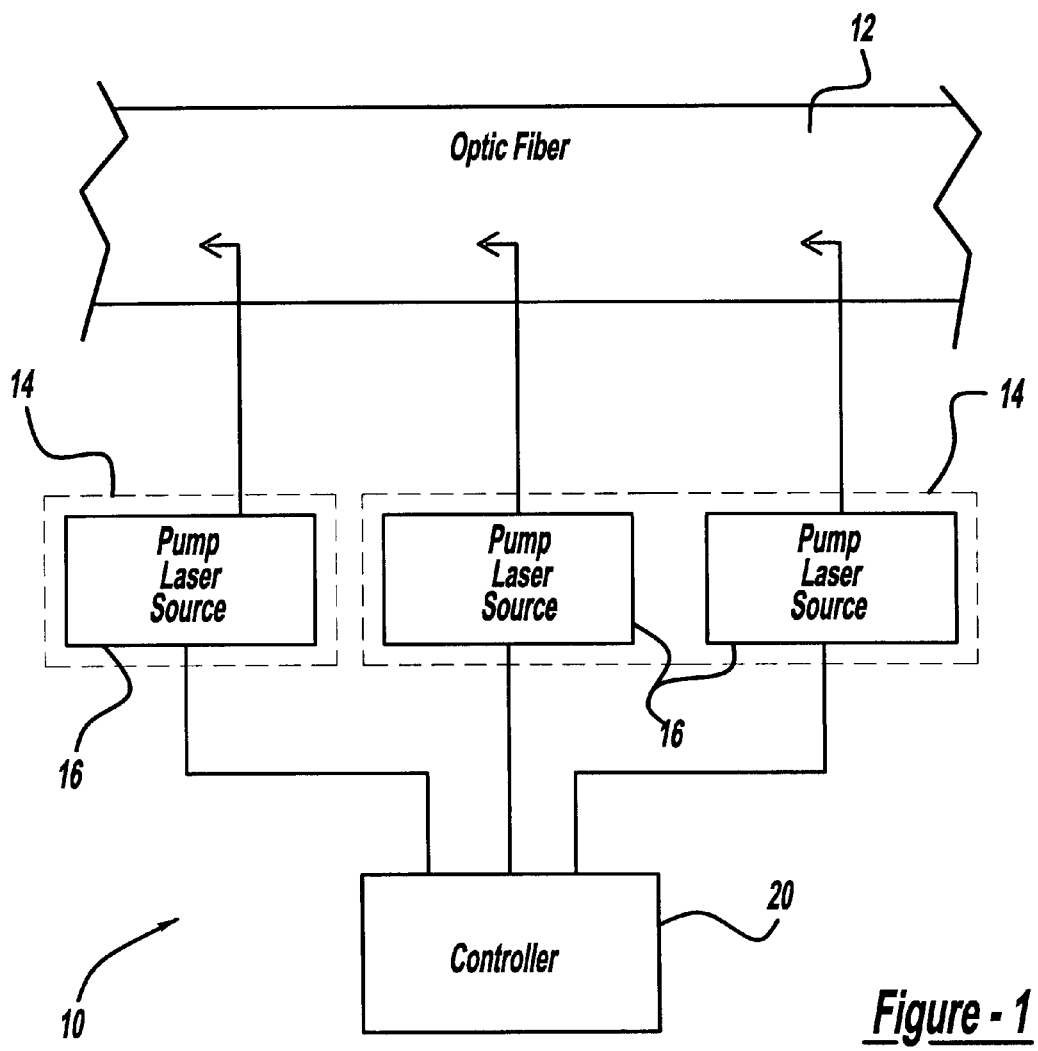
FIG. 1 is a block diagram depicting an exemplary Raman amplifier site integrated into an optical fiber of an optical transport network.

FIG. 1 illustrates an exemplary Raman amplification site 10 integrated into an optical fiber 12 of an optical transport network. In this example, two Raman amplifiers 14 are used to amplify an optical data signal traversing through the optical fiber 12. Each Raman amplifier 14 may include one or more pump laser sources 16. Each pump laser source 16 is operable to introduce intense pump light into the fiber as is well known in the art. The intense pump light excites vibrational modes in the atoms that form the fiber. The energy in the vibrational excitations amplifies the optical data signal in a process referred to as "stimulated Raman scattering". It is understood that the pump laser sources may operate at the same or different wavelengths to achieve the desired Raman gain. Although two Raman amplifiers are shown in FIG. 1, it is readily understood that the amplification site 10 may include three or more Raman amplifiers. In addition, two or more Raman amplifiers may be combined to form a Raman amplifier module.

A controller 20 is connected to each of the pump laser sources 16 residing in the amplification site 10. A laser diode preferably serves as a pump laser source. The laser diode is driven by a current source as is well known in the art. However, it is envisioned that other types of pump laser sources are also with the scope of the present invention. As will be more fully described below, the controller 20 is operable to modulate the operation of two or more of the pump laser sources 16, thereby reducing four-wave mixing in the optical data signal.

Figure 2:
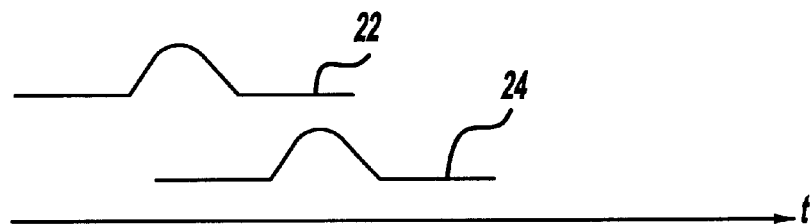
FIG. 2 is a graph illustrating how to synchronously modulate two Raman laser sources in accordance with the present invention.

In accordance with the present invention, at least two pump lasers sources are synchronously modulated in order to reduce four-wave mixing in the optical data signal. Rather than introduce a continuous wave from each of the Raman pump sources into the optical fiber, the light intensity output by the two pump laser sources is varied over time. In a preferred embodiment, the pump laser sources are "pulsed" on and off, such that the light pulses generated by each of the Raman pump laser sources are separated in time as shown in FIG. 2. The pump light introduced into the fiber by a first Raman pump laser source is shown at 22; whereas the pump light introduced into the fiber by a second Raman pump laser source is shown at 24. In order to "pulse" the pump laser sources, the controller may preferably turn on and off the current source driving the laser diode. Although this technique is presently preferred, it is envisioned that other techniques may be suitable used to vary the light intensity output by the pump laser sources. For instance, the light intensity from a pump laser source may be modulated external to the pump laser source through the use of a variable optical attenuator.

Separating light pulses generated by each of the Raman pump laser sources in time and space reduces and in some instance may eliminate the four-wave mixing products degrading the optical data signal. In the preferred embodiment, four-wave mixing is controlled by modulating the intensity of the light "pulses" generated by the Raman amplifiers. As will be apparent to one skilled in the art, the modulation rate and duty cycle of the light "pulses" required to minimize crosstalk from pump modulation to the optical data signals depends on various parameters, including the relative propagation directions of the data and pump lasers (i.e., co- or counter-propagating Raman pumps). It is to be understood that other techniques may be employed to minimize the overlap between the light pulses generated by each of the Raman pump laser sources.

Figure 3A:
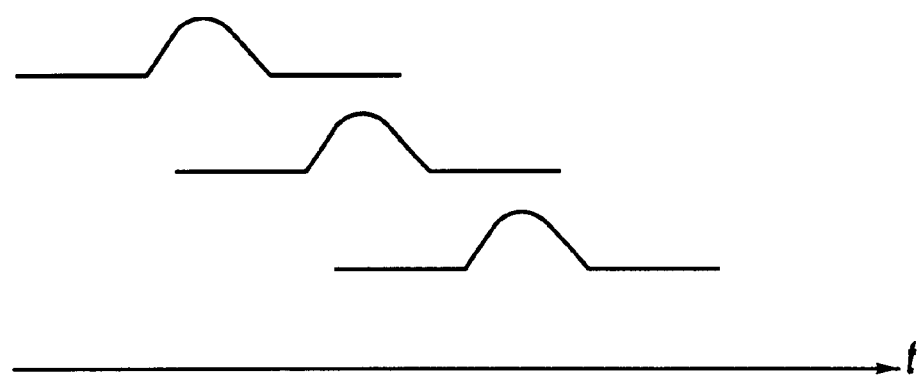
FIGS. 3A–3C are graphs illustrating different control schemes that may be employed to synchronously modulate three Raman laser sources in accordance with the present invention.
Figure 3B:
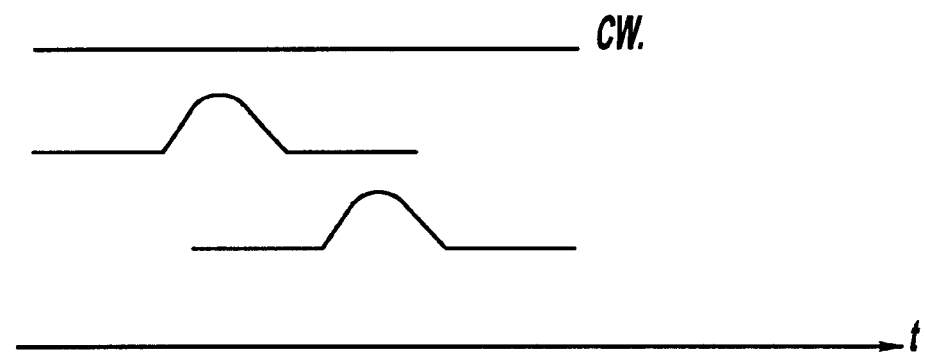
Figure 3C:
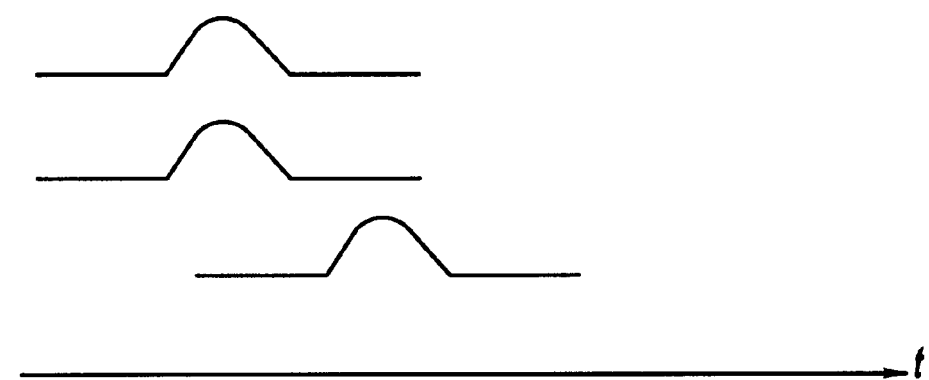

Different control schemes may be employed for amplification sites having three or more Raman pump laser sources. FIGS. 3A, 3B and 3C illustrate some exemplary control schemes that may be employed by such amplification sites. In FIG. 3A, each of the three Raman pump laser sources are pulsed on and off, such that such that the light pulses generated by each of the Raman pump laser sources are separated in time. In FIG. 3B, four-wave mixing products are caused by only two of three Raman pump laser sources. In this case, the two Raman pump laser sources causing the four-wave mixing product may be synchronously modulated as described above, while a third Raman pump laser source operates in continuous wave mode. In the case of degenerate four-wave mixing products, two Raman pump laser sources are synchronously modulated in phase, while a third Raman pump laser source is modulated in antiphase as shown in FIG. 3C. It is to be understood that other control schemes designed to reduce four-wave mixing by synchronously modulating two or more Raman pump laser sources are also within the scope of the present invention.

Although intensity modulation is a presently preferred technique for minimizing the operational overlap between Raman pump laser sources, this is not intended as a limitation on the broader aspects of the present invention. For example, polarization modulation may also be used to minimize the efficiency of four-wave mixing process between Raman pump laser sources. Polarization modulation involves changing the polarization of the light "pulses" generated by the Raman amplifiers. One skilled in the art will readily recognize that various techniques may be employed to vary the polarization of the light "pulse" generated by the Raman amplifiers, for example, by using a Faraday glass polarization rotator with modulated magnetic field.

Figure 4:
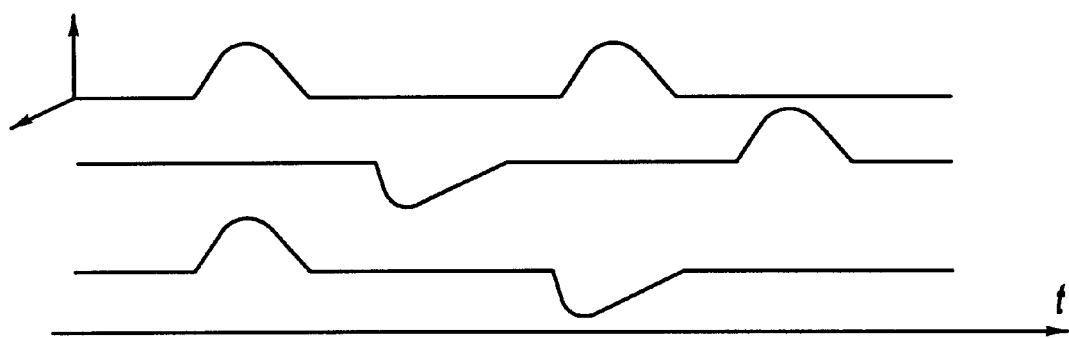
FIG. 4 is a graph illustrating how polarization modulation may be used to in conjunction with synchronous modulation to further minimize operational overlap between two Raman laser sources in accordance with the present invention.

Polarization modulation is preferably used in conjunction with intensity modulation to further reduce and/or eliminate four-wave mixing degrading an optical data signal as shown in FIG. 4. In this example, at least some of the light "pulses" are polarized in a different orientation, thereby further minimizing the operational overlap between the Raman pump laser sources. However, it is to be understood that polarization modulation may also be employed independently from intensity modulation in order to reduce four-wave mixing products that may be caused by the interaction of two or more Raman pump laser sources.

Figure 5:
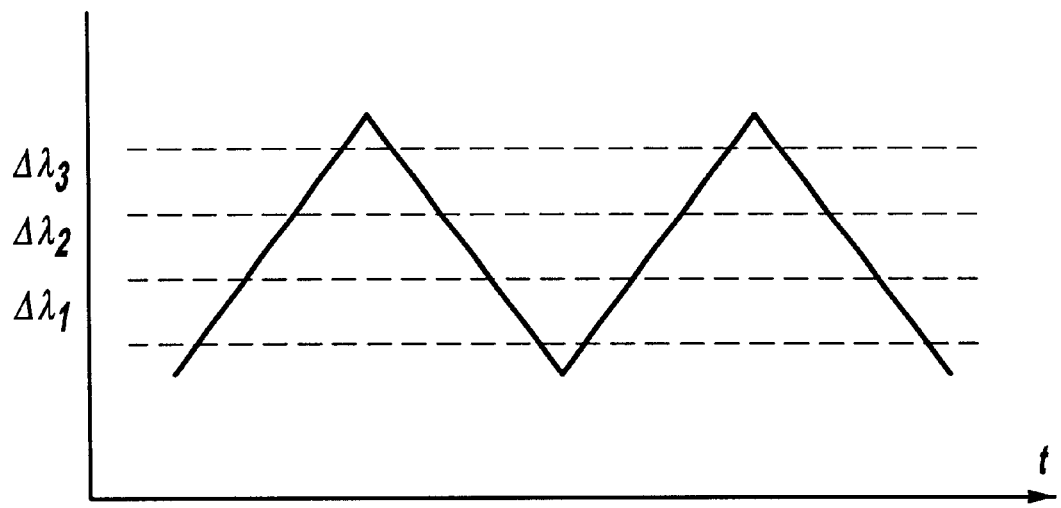
FIG. 5 is graph illustrating how a tunable Raman laser source may be used to reduce four-wave mixing in accordance with the present invention.

Tunable pump laser sources enable another technique for reducing four-wave mixing caused by the interaction of two or more Raman pump laser sources. Tunable pump laser sources allow the operational wavelength of the pump laser to be offset from the dispersion zero wavelength of the optical fiber, thereby reducing the efficiency of the formation of four-wave mixing products. In an alternative control scheme illustrated in FIG. 5, the operational wavelength of one tunable pump laser is modulated to quickly sweep across the range of wavelengths (e.g. $\Delta\lambda.1$, $\Delta\lambda.2$ and $\Delta\lambda.3$) normally occupied by the multiple pump wavelengths required to achieve the broadband Raman gain. By using only one Raman pump laser source in this way the formation of four-wave mixing products is eliminated. Once again, the modulation rate required to minimize crosstalk from pump modulation to the optical data signals depends on various parameters, including the relative propagation directions of the data and pump lasers Likewise, the probability and/or level of four-wave mixing is also reduced when two or more Raman pump laser sources are quickly swept across the operating region. For a given Raman amplifier module, the number of tunable lasers required will depend on the tuning range available and the wavelength range to be amplified by the amplifier. In the case two or more tunable lasers are employed by a given Raman amplifier module, each laser instantaneous frequency could be synchronized in order to avoid the generation of four-wave mixing products in wavelength ranges that carry network traffic. Tunable lasers embodied in different Raman amplifier modules may be synchronized in a similar manner in order to reduce four-wave mixing products.

While this invention has been described in its presently preferred form, it will be understood that the invention is capable of modification without departing from the spirit of the invention as set forth in the appended claims.

What is claimed is:

1. A method for reducing four-wave mixing induced signal degradation in an optical data signal traversing an optical transport network, comprising:

introducing at least two Raman pump laser sources in the optical transport network, each laser source operable to inject a light beam into the optical data signal traversing the optical transport network; and synchronously modulating the laser sources, thereby reducing four-wave mixing in the optical data signal traversing through the optical transport network.

2. The method of claim 1 wherein the step of synchronously modulating the laser sources further comprises selecting a high rate of modulation, thereby minimizing crosstalk between the injected light beams and the optical data signal.

3. The method of claim 1 wherein the step of synchronously modulating the laser sources further comprises changing intensity of the light beams output by the laser sources.

4. The method of claim 1 wherein the step of synchronously modulating the laser sources further comprises pulsing the light beam from a first laser source to produce a light beam having a plurality of light pulses and pulsing the light beam from a second laser source to produce a second light beam having a plurality of light pulses, where the light pulses from each of the laser sources are separated in time.

5. The method of claim 4 wherein at least one of the first and second laser sources is further defined as a laser diode driven by a current source, such that the step of pulsing the light beam from the laser source further comprises turning the current source on and off, thereby pulsing the light beam output by the laser diode.

6. The method of claim 4 further comprises introducing a third Raman pump laser sources operable to inject a light beam into the optical data signal and pulsing the light beam from the third laser source to produce a third light beam having a plurality of light pulses, such that the light pulses from each of the first, second and third Raman amplifier are separated in time.

7. The method of claim 4 further comprises introducing a third Raman pump laser source operable to inject a light beam into the optical data signal and pulsing the light beam from the third laser source to produce a third light beam having a plurality of light pulses, such that light pulses from two of the laser sources are in phase with each other but separated in time from the light pulses from the other laser source.

8. The method of claim 1 wherein the step of synchronously modulating the laser sources further comprises changing polarization of the light output by the laser sources.

9. A method of operating at least two Raman pump laser sources in an optical transport network, comprising:

introducing a first Raman pump laser source and a second Raman pump laser sources in the optical transport network, each laser source operable to inject optical energy into an optical data signal traversing the optical transport network; and synchronously modulating the first and second laser sources, the step of synchronously modulating further comprising
generating optical energy from the first laser source during a first time period;
generating optical energy from the second laser source during a second time period, where the first time period does not substantially overlap with the second time period.

10. The method of claim 9 wherein the step of synchronously modulating the first and second laser sources further comprises changing polarization of the optical energy output by at least one of the laser sources.

11. An optical amplification site residing in an optical transport network, comprising:

an optical fiber having an optical data signal traversing therein;

at least two Raman laser sources connected to the optical fiber, each laser source operable to introduce a light beam into the optical data signal; and a controller connected to each of the laser sources and operable to synchronously modulate the light beams output by the laser sources, thereby reducing four-wave mixing in the optical data signal.

12. The amplification site of claim 11 wherein the controller is operable to change the light intensity of the light beams output by the lasers sources.

13. The amplification site of claim 11 wherein the controller is operable to change the polarization of the light beams output by the lasers sources.

14. The amplification site of claim 11 wherein the controller is operable to pulse the light beam output by each of the laser sources, such that the light pulses from each of the laser sources are separated in time.

15. The amplification site of claim 14 wherein the laser sources are further defined as a laser diode driven by a current source and the controller is operable to control the current source associated with each laser source, thereby pulsing the light beam output by the laser source.

16. A method for reducing four-wave mixing in an optical data signal traversing an optical transport network, comprising:

introducing at least two Raman laser source in the optical transport network, each operable to inject a light beam into the optical data signal traversing the optical transport network; and modulating the polarization of the light beam generated by the laser sources, thereby reducing four-wave mixing in the optical data signal.

17. A method for reducing four-wave mixing in an optical data signal traversing an optical transport network, comprising:

introducing at least two Raman pump laser sources in the optical transport network, each laser source operable to inject a light beam at an optical frequency into the optical data signal; and varying the optical frequency of the light beam generated by each of the laser sources, thereby reducing four-wave mixing in the optical data signal.

18. The method of claim 17 wherein the step of varying the optical frequency of the light beam further comprises sweeping the optical frequency of the light beam over a range of frequencies.

19. The method of claim 17 wherein the step of varying the optical frequency of the light beam further comprises synchronizing the instantaneous optical frequency of the light beam between the two laser sources.

* * * * *